US006941458B1

(12) United States Patent
Ellison et al.

(10) Patent No.: US 6,941,458 B1
(45) Date of Patent: Sep. 6, 2005

(54) MANAGING A SECURE PLATFORM USING A HIERARCHICAL EXECUTIVE ARCHITECTURE IN ISOLATED EXECUTION MODE

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Milland Mittal, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 914 days.

(21) Appl. No.: 09/668,585

(22) Filed: Sep. 22, 2000

Related U.S. Application Data

(63) Continuation-in-part of application No. 09/539,344, filed on Mar. 31, 2000.

(51) Int. Cl.$^7$ .................................................. H04L 9/00
(52) U.S. Cl. ........................ 713/164; 713/166; 713/167
(58) Field of Search ................................ 713/164, 166, 713/167

(56) References Cited

U.S. PATENT DOCUMENTS

| | | | | |
|---|---|---|---|---|
| 3,699,532 A | | 10/1972 | Schaffer | |
| 3,996,449 A | | 12/1976 | Attanasio et al. | |
| 4,037,214 A | | 7/1977 | Birney et al. | |
| 4,162,536 A | | 7/1979 | Morley | |
| 4,207,609 A | * | 6/1980 | Luiz et al. | 710/38 |

(Continued)

FOREIGN PATENT DOCUMENTS

| | | |
|---|---|---|
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| JP | 11161521 A | 6/1999 |
| JP | 02000076139 A | 3/2000 |
| WO | WO9524696 | 9/1995 |

(Continued)

OTHER PUBLICATIONS

Brands, Stefan , "Restrictive Blinding of Secret–Key Certificates", *Springer–Verlag XP002201306*, (1995),Chapter 3.

(Continued)

*Primary Examiner*—Gilberto Barrón, Jr.
*Assistant Examiner*—Grigory Gurshman
(74) *Attorney, Agent, or Firm*—Michael R. Barre

(57) ABSTRACT

A processor executive (PE) handles an operating system executive (OSE) in a secure environment. The secure environment has a platform key (PK) and is associated with an isolated memory area in the platform. The OSE manages a subset of an operating system (OS) running on the platform. The platform has a processor operating in one of a normal execution mode and an isolated execution mode. The isolated memory area is accessible to the processor in the isolated execution mode. A PE supplement supplements the PE with a PE manifest representing the PE and a PE identifier to identify the PE. A PE handler handles the PE using the PK and the PE supplement.

44 Claims, 13 Drawing Sheets

U.S. PATENT DOCUMENTS 4,247,905 A 1/1981 Yoshida et al.
4,276,594 A 6/1981 Morley
4,278,837 A 7/1981 Best
4,307,447 A 12/1981 Provanzano et al.
4,319,233 A 3/1982 Matsuoka et al.
4,319,323 A 3/1982 Ermolovich et al.
4,347,565 A 8/1982 Kaneda et al.
4,366,537 A 12/1982 Heller et al.
4,403,283 A 9/1983 Myntti et al.
4,419,724 A * 12/1983 Branigin et al. ............ 710/108
4,430,709 A 2/1984 Schleupen
4,521,852 A 6/1985 Guttag
4,571,672 A 2/1986 Hatada et al.
4,759,064 A 7/1988 Chaum
4,795,893 A 1/1989 Ugon
4,802,084 A 1/1989 Ikegaya et al.
4,975,836 A 12/1990 Hirosawa et al.
5,007,082 A 4/1991 Cummins
5,022,077 A 6/1991 Bealkowski et al.
5,075,842 A 12/1991 Lai
5,079,737 A 1/1992 Hackbarth
5,187,802 A 2/1993 Inoue et al.
5,230,069 A 7/1993 Brelsford et al.
5,237,616 A 8/1993 Abraham et al.
5,255,379 A 10/1993 Melo
5,287,363 A 2/1994 Wolf et al.
5,293,424 A 3/1994 Holtey et al.
5,295,251 A 3/1994 Wakui et al.
5,303,378 A 4/1994 Cohen
5,317,705 A 5/1994 Gannon et al.
5,319,760 A 6/1994 Mason et al.
5,361,375 A 11/1994 Ogi
5,386,552 A 1/1995 Garney
5,421,006 A 5/1995 Jablon et al.
5,437,033 A 7/1995 Inoue et al.
5,455,909 A 10/1995 Blomgren et al.
5,459,867 A 10/1995 Adams et al.
5,459,869 A 10/1995 Spilo
5,469,557 A 11/1995 Salt et al.
5,473,692 A 12/1995 Davis
5,479,509 A 12/1995 Ugon
5,504,922 A 4/1996 Seki et al.
5,506,975 A 4/1996 Onodera
5,511,217 A 4/1996 Nakajima et al.
5,522,075 A 5/1996 Robinson et al.
5,555,385 A 9/1996 Osisek
5,555,414 A 9/1996 Hough et al.
5,560,013 A 9/1996 Scalzi et al.
5,564,040 A 10/1996 Kubals
5,568,552 A 10/1996 Davis
5,574,936 A 11/1996 Ryba et al.
5,582,717 A 12/1996 Di Santo
5,604,805 A 2/1997 Brands
5,606,617 A 2/1997 Brands
5,615,263 A 3/1997 Takahashi
5,628,022 A * 5/1997 Ueno et al.
5,633,929 A 5/1997 Kaliski, Jr.
5,657,445 A 8/1997 Pearce
5,668,971 A 9/1997 Neufeld
5,684,948 A 11/1997 Johnson et al.
5,706,469 A 1/1998 Kobayashi
5,717,903 A 2/1998 Bonola
5,729,760 A 3/1998 Poisner
5,737,604 A 4/1998 Miller et al.
5,737,760 A * 4/1998 Grimmer, Jr. et al.
5,740,178 A 4/1998 Jacks et al.
5,752,046 A 5/1998 Oprescu et al.
5,757,919 A * 5/1998 Herbert et al.
5,764,969 A 6/1998 Kahle et al.
5,796,845 A 8/1998 Serikawa et al.
5,805,712 A 9/1998 Davis
5,809,546 A * 9/1998 Greenstein et al. ......... 711/164
5,825,880 A 10/1998 Sudia et al.
5,835,594 A 11/1998 Albrecht et al.
5,844,986 A 12/1998 Davis
5,852,717 A * 12/1998 Bhide et al.
5,854,913 A 12/1998 Goetz et al.
5,872,994 A * 2/1999 Akiyama et al.
5,890,189 A 3/1999 Nozue et al.
5,898,883 A 4/1999 Fujii et al.
5,901,225 A 5/1999 Ireton et al.
5,919,257 A 7/1999 Trostle
5,935,242 A 8/1999 Madany et al.
5,935,247 A 8/1999 Pai et al.
5,937,063 A 8/1999 Davis
5,950,221 A 9/1999 Draves et al.
5,953,502 A 9/1999 Helbig, Sr.
5,956,408 A 9/1999 Arnold
5,970,147 A 10/1999 Davis
5,978,475 A 11/1999 Schneier et al.
5,978,481 A 11/1999 Ganesan et al.
5,987,557 A 11/1999 Ebrahim
6,014,745 A 1/2000 Ashe
6,035,374 A 3/2000 Panwar et al.
6,044,478 A 3/2000 Green
6,055,637 A * 4/2000 Hudson et al.
6,058,478 A 5/2000 Davis
6,061,794 A 5/2000 Angelo et al.
6,075,938 A 6/2000 Bugnion et al.
6,085,296 A * 7/2000 Karkhanis et al.
6,088,262 A 7/2000 Nasu
6,092,095 A 7/2000 Maytal
6,093,213 A 7/2000 Favor et al.
6,101,584 A 8/2000 Satou et al.
6,108,644 A 8/2000 Goldschlag et al.
6,115,816 A 9/2000 Davis
6,125,430 A * 9/2000 Noel et al.
6,131,166 A 10/2000 Wong-Insley
6,148,379 A * 11/2000 Schimmel
6,158,546 A 12/2000 Hanson et al.
6,173,417 B1 1/2001 Merrill
6,175,924 B1 1/2001 Arnold
6,175,925 B1 1/2001 Nardone et al.
6,178,509 B1 1/2001 Nardone et al.
6,182,089 B1 1/2001 Ganapathy et al.
6,188,257 B1 2/2001 Buer
6,192,455 B1 * 2/2001 Bogin et al.
6,199,152 B1 3/2001 Kelly et al.
6,205,550 B1 3/2001 Nardone et al.
6,212,635 B1 4/2001 Reardon
6,222,923 B1 4/2001 Schwenk
6,226,749 B1 5/2001 Carloganu et al.
6,249,872 B1 * 6/2001 Wildgrube et al.
6,252,650 B1 6/2001 Nakamura
6,269,392 B1 7/2001 Cotichini et al.
6,272,533 B1 * 8/2001 Browne
6,272,637 B1 8/2001 Little et al.
6,275,933 B1 8/2001 Fine et al.
6,282,650 B1 8/2001 Davis
6,282,651 B1 8/2001 Ashe
6,282,657 B1 8/2001 Kaplan et al.
6,292,874 B1 * 9/2001 Barnett
6,301,646 B1 * 10/2001 Hostetter
6,314,409 B2 11/2001 Schneck et al.
6,321,314 B1 * 11/2001 Van Dyke
6,327,652 B1 12/2001 England et al.
6,330,670 B1 12/2001 England et al.
6,339,815 B1 * 1/2002 Feng et al.
6,339,816 B1 * 1/2002 Bausch
6,357,004 B1 3/2002 Davis
6,363,485 B1 3/2002 Adams et al.

| | | | | |
|---|---|---|---|---|
| 6,374,286 | B1 | | 4/2002 | Gee et al. |
| 6,374,317 | B1 | | 4/2002 | Ajanovic et al. |
| 6,378,068 | B1 | | 4/2002 | Foster et al. |
| 6,378,072 | B1 | | 4/2002 | Collins et al. |
| 6,389,537 | B1 | | 5/2002 | Davis et al. |
| 6,397,242 | B1 | | 5/2002 | Devine et al. |
| 6,397,379 | B1 | | 5/2002 | Yates, Jr. et al. |
| 6,412,035 | B1 | | 6/2002 | Webber |
| 6,421,702 | B1 | | 7/2002 | Gulick |
| 6,445,797 | B1 | | 9/2002 | McGough |
| 6,463,535 | B1 | | 10/2002 | Drews |
| 6,463,537 | B1 | | 10/2002 | Tello |
| 6,499,123 | B1 | * | 12/2002 | McFarland et al. |
| 6,505,279 | B1 | * | 1/2003 | Phillips et al. |
| 6,507,904 | B1 | | 1/2003 | Ellison et al. |
| 6,529,909 | B1 | | 3/2003 | Bowman-Amuah |
| 6,535,988 | B1 | | 3/2003 | Poisner |
| 6,557,104 | B2 | | 4/2003 | Vu et al. |
| 6,560,627 | B1 | | 5/2003 | McDonald et al. |
| 6,609,199 | B1 | | 8/2003 | DeTreville |
| 6,615,278 | B1 | | 9/2003 | Curtis |
| 6,633,963 | B1 | | 10/2003 | Ellison et al. |
| 6,633,981 | B1 | | 10/2003 | Davis |
| 6,651,171 | B1 | | 11/2003 | England et al. |
| 6,678,825 | B1 | | 1/2004 | Ellison et al. |
| 6,684,326 | B1 | | 1/2004 | Cromer et al. |
| 6,701,284 | B1 | | 3/2004 | Huntley et al. |
| 2001/0021969 | A1 | | 9/2001 | Burger et al. |
| 2001/0027527 | A1 | | 10/2001 | Khidekel et al. |
| 2001/0037450 | A1 | | 11/2001 | Metlitski et al. |

FOREIGN PATENT DOCUMENTS

| | | |
|---|---|---|
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO99/38076 | 7/1999 |
| WO | WO9957863 | 11/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO175565 | 10/2001 |
| WO | WO 01/75565 | 10/2001 |
| WO | WO0175565 | 10/2001 |
| WO | WO 01/75595 | 10/2001 |
| WO | WO0175595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0–8186–1939–2,(May 1989).

Kashiwagi, Kazuhiko , et al., "Design and Implementation of Dynamically Reconstructing System Software", *Software Engineering Conference*, Proceedings 1996 Asia–Pacific Seoul, South Korea Dec. 4–7, 1996, Los Alamitos, CA USA, IEEE Comput. Soc, US, ISBN 0–8186–7638–8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC, USA XP002201307*, (1997), 475.

Richt, Stefan , et al., "In–Circuit–Emulator Wird Echtzeittauglich", *Elektronic Franzis Verlag GMBH, Munchen, DE*, vol. 40, No. 16, XP000259620,(100–103),Aug. 6, 1991.

Saez, Sergio , et al., "A Hardware Scheduler for Complex Real–Time Systems", *Proceedings of the IEEE International Symposium on Industrial Electronics*, XP002190615, (Jul. 1999),43–48.

Sherwood, Timothy , et al., "Patchable Instruction ROM Architecture", *Department of Computer Science and Engineering, University of California, San Diego, La Jolla, CA*, (Nov. 2001).

J. Heinrich: "MIPS R4000 Microprocessor User's Manual," Apr. 1, 1993, MIPS, MT. View, XP002184449, pp. 61–67.

Goldberg, R., "Survey of virtual machine research," IEEE Computer Magazine 7(6), pp. 34–45, 1974.

Gum, P.H., "System/370 Extended Architecture: Facilities for Virtual Machines," IBM J. Research Development, Vol 27, No. 6, pp. 530–544, Nov. 1983.

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

"Information Display Technique for a Terminate Stay Resident Program," IBM Technical Disclosure Bulletin, TDB–ACC–No. NA9112156, Dec. 1, 1991, pp. 156–158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1–17, XP002247347, Denver, CO.

Karger, Paul A., et al., "A VMM Security Kernel for the VAX Architecture," Proceedings of the Symposium on Research in Security and Privacy, May 7, 1990, pp. 2–19, XP010020182, ISBN: 0–8186–2060–9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209–221, XP010359180, ISBN: 0–7695–0375–6, Los Alamitos, CA.

"M68040 User's Manual", 1993, Motorola Inc., p. 1–5—p. 1–9, p. 1–13–p. 1–20, p. 2–1–p. 2–3, p. 4–1, p. 8–9–p. 8–11.

"Intel 386 DX Microprocessor 32–Bit Chmos Microprocesser With Integrated Memory Management", Dec. 31, 1995, Intel Inc., p. 32–56; figure 4–14.

Joe Heinrich:"MIPS R4000 Microprocessor User's Manual", 1994, MIPS Technology Inc., Mountain View, CA, pp. 67–79.

Berg C: "How do I Create a Signed Applet?", Dr. Dobb's Journal, M&T Publ., Redwood City, CA, US, vol. 22, No. 8, 8 '97, p. 109–111, 122.

Gong L et al: "Going Beyond the Sandbox: an Overview of the New Security Architecture in the Java Development Kit 1.2", Proceedings of the Usenix Symposium on Internet Technologies and Systems, Montery, CA 12 '97, pp. 103–112.

Coulouris, George , et al., "Distributed Systems, Concepts and Designs", *2nd Edition*, (1994), 422–424.
Crawford, John, "Architecture of the Intel 80386", *Proceedings of the IEEE International Conference on Computer Design: VLSI in Computers and Processors* (*ICCD '86*), (Oct. 6, 1986), 155–160.
Fabry, R.S. , "Capability–Based Addressing", *Fabry, R.S., "Capability–Based Adressing,"Communications of the ACM, vol. 17, No. 7*, (Jul. 1974), 403–412.
Frieder, Gideon , "The Architecture And Operational Characteristics of the VMX Host Machine", *The Architecture and Operational Characteristics of the VMX Host Machine, IEEE*, (1982), 9–16.
Intel Corporation, "IA–64 System Abstraction Layer Specification", *Intel Product Specification, Order No. 245359–001*, (Jan. 2000),1–112.
Intel Corporation, "Intel IA–64 Architecture Sofrware Developer's Manual", *vol. 2: IA–64 System Architecture, Order No. 245318–001*, (Jan. 2000),i, ii, 5.1–5.3, 11.1–11.8, 11.23–11.26.
Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403–405, 506–515, 570.
Nanba, S. , et al., "VM/4: ACOS–4 Virtual Machine Architecture",*VM/4: ACOS–4 Virtual Machine Architecture, IEEE*, (1985), 171–178.

RSA Security, "Hardware Authenticators" www.rsasecurity.com/node.asp?id=1158, 1–2.

RSA Security, "RSA SecurID Authenticators", www.rsasecurity.com/products/securid/datasheets/SID_DS_0103.pdf, 1–2.

RSA Security, "Software Authenticators", www.srasecurity.com/node.asp?id=1313, 1–2.

Schneier, Bruce , "Applied Cryptography: Protocols, Algorithm, and Source Code in C", *Wiley, John & Sons, Inc.*, XP002939871; ISBN 0471117099,(Oct. 1995),47–52.

Schneier, Bruce , "Applied Cryptography: Protocols, Algorithm, and Source Code in C", *Wiley, John & Sons, Inc.*, XP002138607; ISBN 0471117099,(Oct. 1995),56–65.

Schneier, Bruce , "Applied Cryptography: Protocols, Algorithms, and Source Code C", *Wiley, John & Sons, Inc.*, XP0021111449; ISBN 0471117099,(Oct. 1995), 169–187.

Schneier, Bruce , "Applied Cryptography: Protocols, Algorithms, and Source Code in C", *2nd Edition; Wiley, John & Sons, Inc.*, XP002251738; ISBN 0471128457,(Nov. 1995), 28–33; 176–177;216–217; 461–473; 518–522.

* cited by examiner

MANAGING A SECURE PLATFORM USING A HIERARCHICAL EXECUTIVE ARCHITECTURE IN ISOLATED EXECUTION MODE

CROSS-REFERENCES TO RELATED APPLICATIONS

This is a continuation-in-part of U.S. patent application No. 09/539,344 filed Mar. 31, 2000.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modem microprocessor systems provide users convenient and efficient methods of doing business, communicating and transacting, they are also vulnerable for unscrupulous attacks. Examples of these attacks include theft of data, virus, intrusion, security breach, and tampering, to name a few. Computer security, therefore, is becoming more and more important to protect the integrity of the computer systems and increase the trust of users.

Threats caused by unscrupulous attacks may be in a number of forms. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DESCRIPTION

Figure 1A:
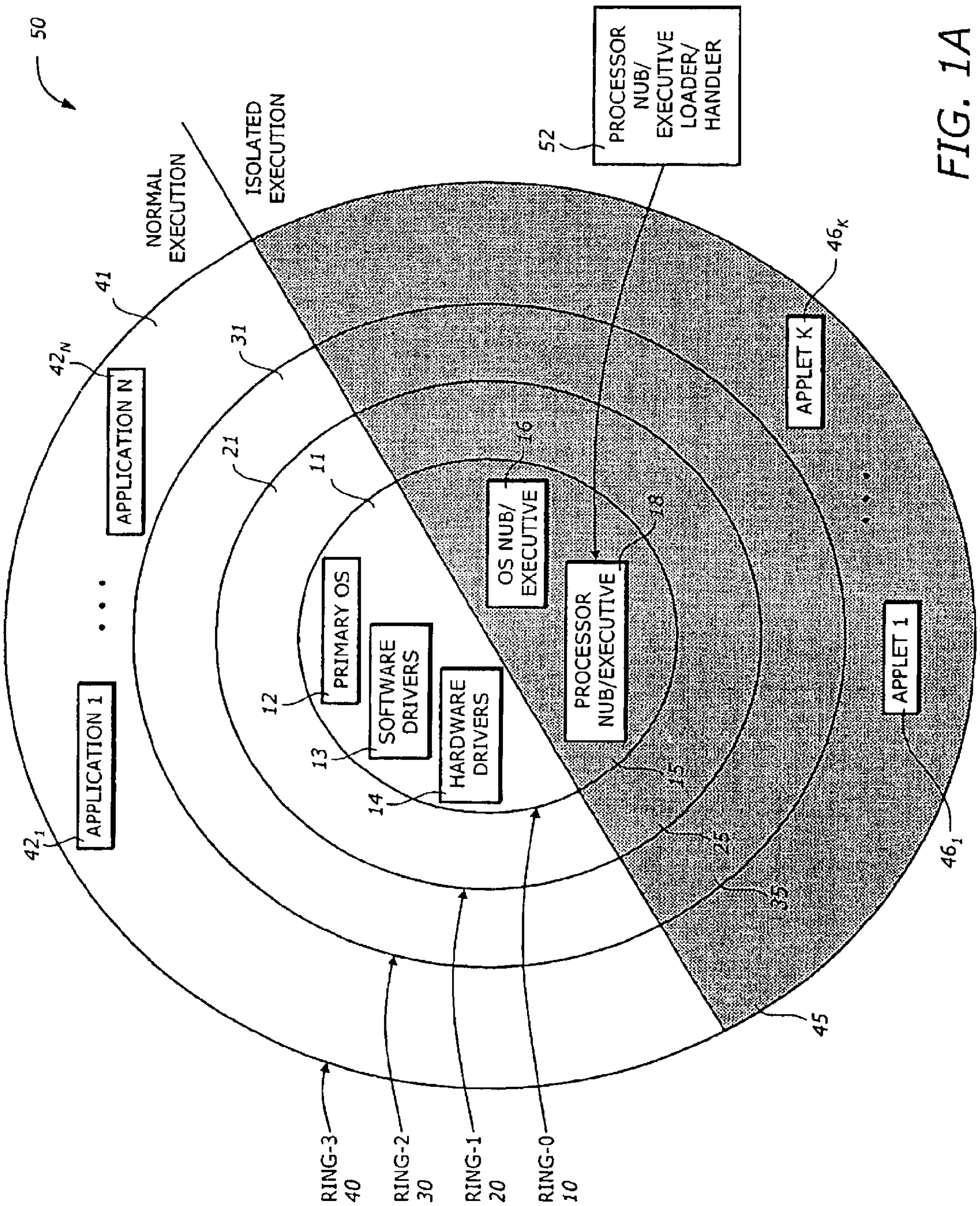
FIG. 1A is a diagram illustrating a logical architecture according to one embodiment of the invention.

The present invention is a method and apparatus to manage a secure platform. A processor executive (PE) handles an operating system executive (OSE) in a secure environment. The secure environment has a platform key (PK) and is associated with an isolated memory area in the platform. The OSE manages a subset of an operating system (OS) running on the platform. The platform has a processor operating in one of a normal execution mode and an isolated execution mode. The isolated memory area is accessible to the processor in the isolated execution mode. A PE supplement supplements the PE with a PE manifest representing the PE and a PE identifier to identify the PE. A PE handler handles the PE using the PK and the PE supplement.

A boot-up code boots up the platform following a power on. The secure environment includes an OSE supplement to supplement the OSE with an OSE manifest representing the OSE and an OSE identifier to identify the OSE. The PE handler includes a PE loader, a PE manifest verifier, a PE verifier, a PE key generator, a PE identifier logger, and a PE entrance/exit handler. The PE loader loads the PE and the PE supplement from a PE memory into the isolated memory area using a parameter block provided by the boot-up code. The PE manifest verifier verifies the PE manifest. The PE verifier verifies the PE using the PE manifest and a constant derived from the PK. The PE key generator generates a PE key using the PK. The PE key generator includes a PE key combiner to combine the PE identifier and the PK. The combined PE identifier and the PK correspond to the PE key. The PE identifier logger logs the PE identifier in a storage. The PE entrance/exit handler handles a PE entry and a PE exit.

The OSE handler includes an OSE loader, an OSE manifest verifier, an OSE verifier, an OSE key generator, an OSE identifier logger, and an OSE entrance/exit handler. The OSE loader loads the OSE and the OSE supplement into the isolated memory area. The OSE manifest verifier verifies the OSE manifest. The OSE verifier verifies the OSE. The OSE key generator generates an OSE key. The OSE identifier logger logs the OSE identifier in a storage. The OSE entrance/exit handler handles an OSE entry and an OSE exit. The OSE key generator includes a binding key generator and an OSE key combiner. The binding key generator generates a binding key (BK) using the PE key. The OSE key combiner combines the OSE identifier and the BK. The combined OSE identifier and the BK correspond to the OSE key.

The OSE includes a module loader and evictor, a key binder and unbinder, a page manager, an interface handler, a scheduler and balancer, and an interrupt handler. The module loader and evictor loads and evicts a module into and out of the isolated memory area, respectively. The module is one of an application module, an applet module, and a support module. The page manager manages paging in the isolated memory area. The interface handler handles interface with the OS. The key binder and unbinder includes an applet key generator to generate an applet key associating with the applet module. The applet key generator includes an applet key combiner to combine the OSE key with an applet identifier identifying the applet module. The combined OSE key and the applet identifier correspond to the applet key.

The boot up code includes a PE locator, a PE recorder, and an instruction invoker. The PE locator locates the PE and the PE supplement. The PE locator transfers the PE and the PE supplement into the PE memory at a PE address. The PE recorder records the PE address in the parameter block. The instruction invoker executes an isolated create instruction which loads the PE handler into the isolated memory area. The isolated create instruction performs an atomic non-interruptible sequence. The atomic sequence includes a number of operations: a physical memory operation, an atomic read-and-increment operation, an isolated memory area control operation, a processor isolated execution operation, an PE handler loading operation, a PE handler verification, and an exit operation. The physical memory operation verifies if the processor is in a flat physical page mode. The atomic read-and-increment operation reads and increments a thread count register in a chipset. The read-and-increment operation determines if the processor is the first processor in the isolated execution mode. The isolated memory area control operation configures the chipset using a configuration storage. The processor isolated execution operation configures the processor in the isolated execution mode. The processor isolated execution operation includes a chipset read operation and a processor configuration operation. The chipset read operation reads the configuration storage in the chipset when the processor is not a first processor in the isolated execution mode. The processor configuration operation configures the processor according to the configuration storage when the processor is not a first processor in the isolated execution mode. The PE handler loading operation loads the PE handler into the isolated memory area. The PE handler verification verifies the loaded PE handler. The exit operation transfers control to the loaded PE handler.

The chipset includes at least one of a memory controller hub (MCH) and an input/output controller hub (ICH). The storage is in an input/output controller hub (ICH) external to the processor.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and executes the least trusted code. It is noted that the level of the ring hierarchy is independent to the level of the security protection of that ring.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $\mathbf{42}_l$, to $\mathbf{42}_N$and isolated execution ring-3 includes K applets $\mathbf{46}_l$, to $\mathbf{46}_K$.

One concept of the isolated execution architecture is the creation of an isolated region in the system memory, referred to as an isolated area, which is protected by both the processor and chipset in the computer system. Portions of the isolated region may also be in cache memory. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode when accessing the isolated area. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub loader 52 and processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected operating system), provides page management within the isolated area, and has the responsibility for loading ring-3 application modules 45, including applets 46$_1$, to 46$_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets 46$_1$, to 46$_K$ and their data are tamper-resistant and monitor-resistant from all software attacks from other applets, as well as from non-isolated-space applications (e.g., 42$_1$, to 42$_N$), drivers and even the primary operating system 12. The only software that can interfere with or monitor the applet's execution is the processor nub loader 52, processor nub 18 or the operating system nub 16.

Figure 1B:
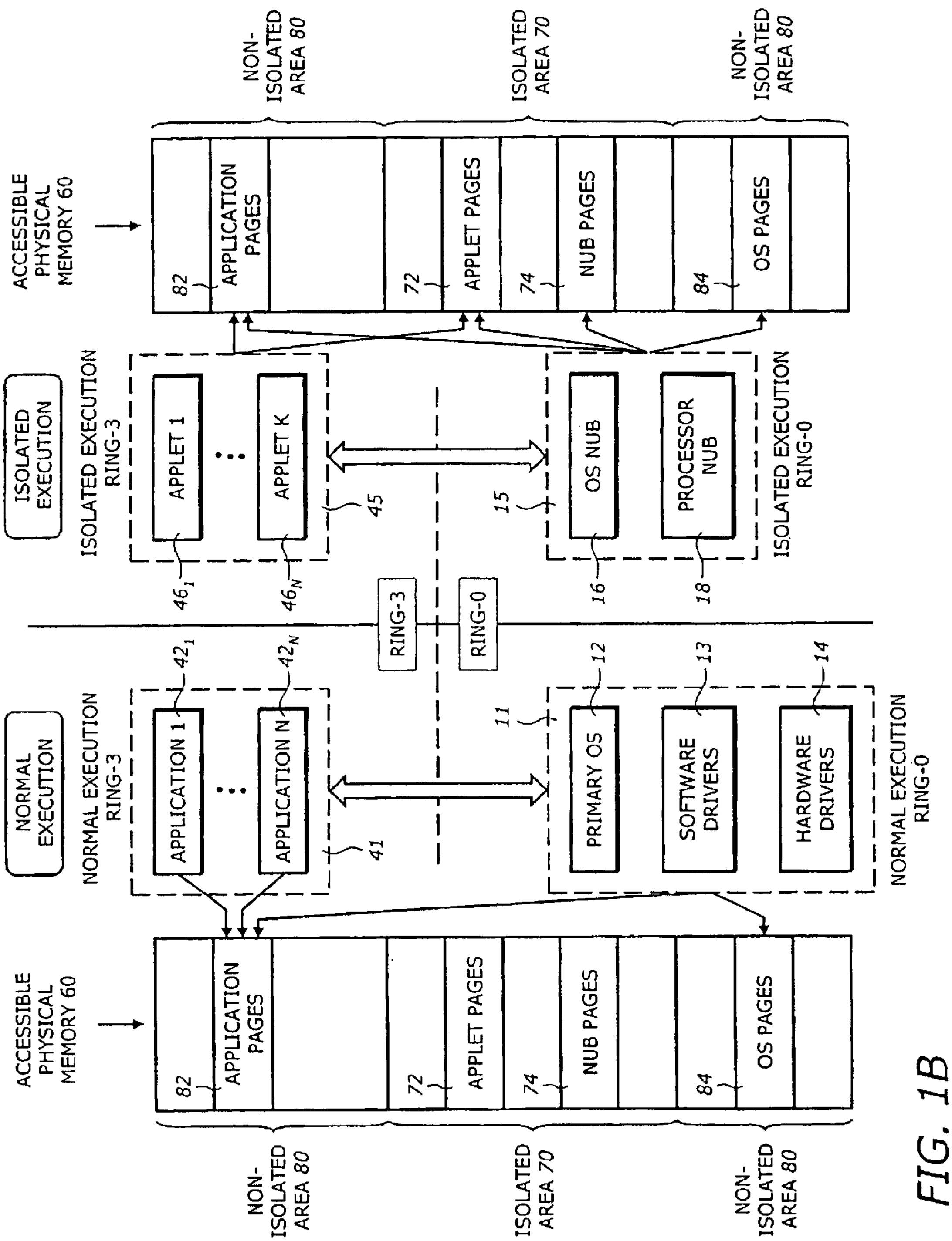
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications 42$_1$, to 42$_N$, can access only to the application pages 82. Generally applications can only access to their own pages, however, the OS typically provides services for sharing memory in controlled methods. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets 46$_1$, to 46$_K$, can access only applet pages 72. The applets 46$_1$, to 46$_K$reside in the isolated area 70. In general, applets can only access their own pages; however, the OS nub 16 can also provides services for the applet to share memory (e.g., share memory with other applets or with non-isolated area applications).

Figure 1C:
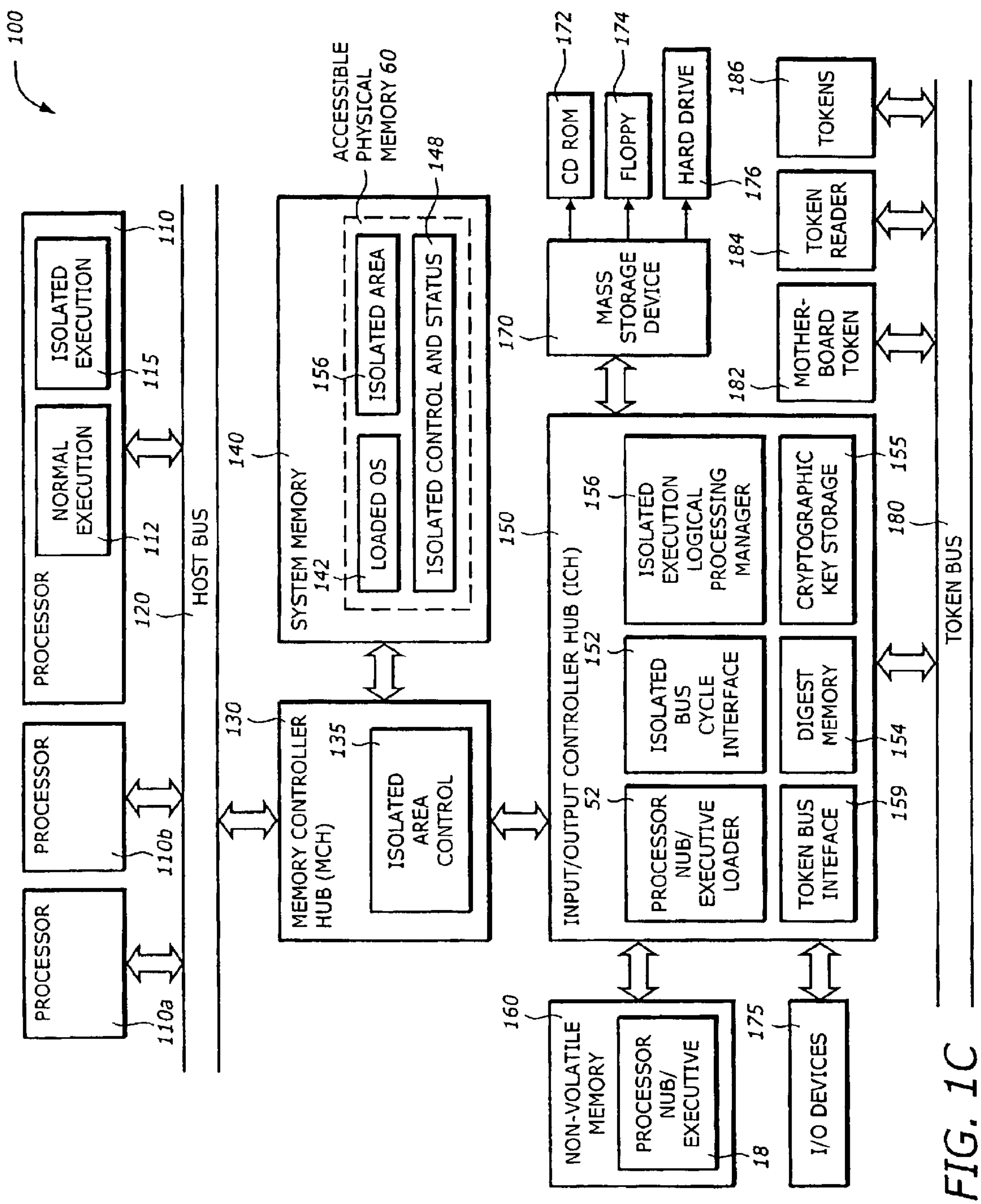
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (TJSB), etc. The "token bus" may be part of the USB bus, e.g., it maybe hosted on the USB bus.

The processor 110 represents a central processing unit of any type of architecture, such as complex instruction set computers (CISC), reduced instruction set computers (RISC), very long instruction word.(VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and access checking.

In one embodiment, the computer system 100 can be a single processor system, such as a desktop computer, which has only one main central processing unit, e.g. processor 110. In other embodiments, the computer system 100 can include multiple processors, e.g. processors 110, 110*a*, 110*b*, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110*a* and 110*b*, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110*a*, and 110*b*) may have multiple multi-threaded processors.

The host bus 120 provides interface signals to allow the processor 110 or processors 110, 100*a*, and 110*b* to communicate with other processors or devices, e.g., the MCH 130. In addition to normal mode, the host bus 120 provides an isolated access bus mode with corresponding interface signals for memory read and write cycles. The isolated access bus mode is asserted on memory accesses initiated while the processor 110 is in the isolated execution mode and it is accessing memory within the isolated area. The isolated access bus mode is also asserted on instruction pre-fetch and cache write-back cycles if the address is within the isolated area address range. The isolated access bus mode is configured within the processor 110. The processor 110 responds to a snoop cycle to a cached address when the isolated access bus mode on the FSB matches the mode of the cached address.

The MCH 130 provides control and configuration of system memory 140. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110. The isolated control and status space 148 contains mainly the isolated execution control and status registers. The isolated control and status space 148 does not overlap any existing address space and is accessed using the isolated bus cycles. The system memory 140 may also include other programs or data that are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., cryptographic hash) value. The processor nub loader 52 is invoked by execution of an appropriate isolated instruction (e.g., $Iso_{13}$Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., cryptographic hash) values of the loaded processor nub 18, the operating system nub 16, and any other supervisory modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created during manufacturing with a cryptographic random number generator. The isolated execution logical processor manager 156 manages the operation of logical processors configuring their isolated execution mode support. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the all supervisory code involved in controlling the isolated execution configuration and operation. The isolated digest is used to attest or prove the state of the current isolated execution environment.

The non-volatile memory 160 stores non-volatile information. Typically, the non-volatile memory 160 is implemented in flash memory. In one embodiment, the non-volatile memory 160 includes the processor nub 18. The processor nub 18 provides set-up and low-level management of the isolated area 70 (in the system memory 140), including verification, loading, and logging of the operating system nub 16, and the management of the symmetric key used to protect the operating system nub's secrets. The processor nub loader 52 performs some part of the setup and manages/updates the symmetric key before the processor nub 18 and the OS nub 16 are loaded. The processor nub 18 The processor nub 18 may also provide interface abstractions to low-level security services provided by other hardware. The processor nub 18 may also be distributed by the original equipment manufacturer (OEM) or operating system vendor (OSV).

The mass storage device 170 stores archive information such as code (e.g., processor nub 18), programs, files, data, applications (e.g., applications $\mathbf{42}_1$to $\mathbf{42}_N$), applets (e.g., applets $\mathbf{46}_1$, to $\mathbf{46}_K$) and operating systems. The mass storage device 170 may include compact disk (CD) ROM 172, floppy diskettes 174, and hard drive 176, and any other storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory via the token bus 180.

A Hierrachical Executive Architecture to Manage a Secure Platform

The overall architecture discussed above provides a basic insight into a hierarchical executive architecture to manage a secure platform. The elements shown in FIGS. 1A, 1B, and 1C are instances of an abstract model of this hierarchical executive architecture. The implementation of this hierarchical executive architecture is a combination of hardware and software. In what follows, the processor executive, the processor executive handler, and the operating system executive are abstract models of the processor nub 18, the processor nub loader 52, and the operating system nub 16 (FIGS. 1A, 1B, and 1C), respectively.

Figure 2:
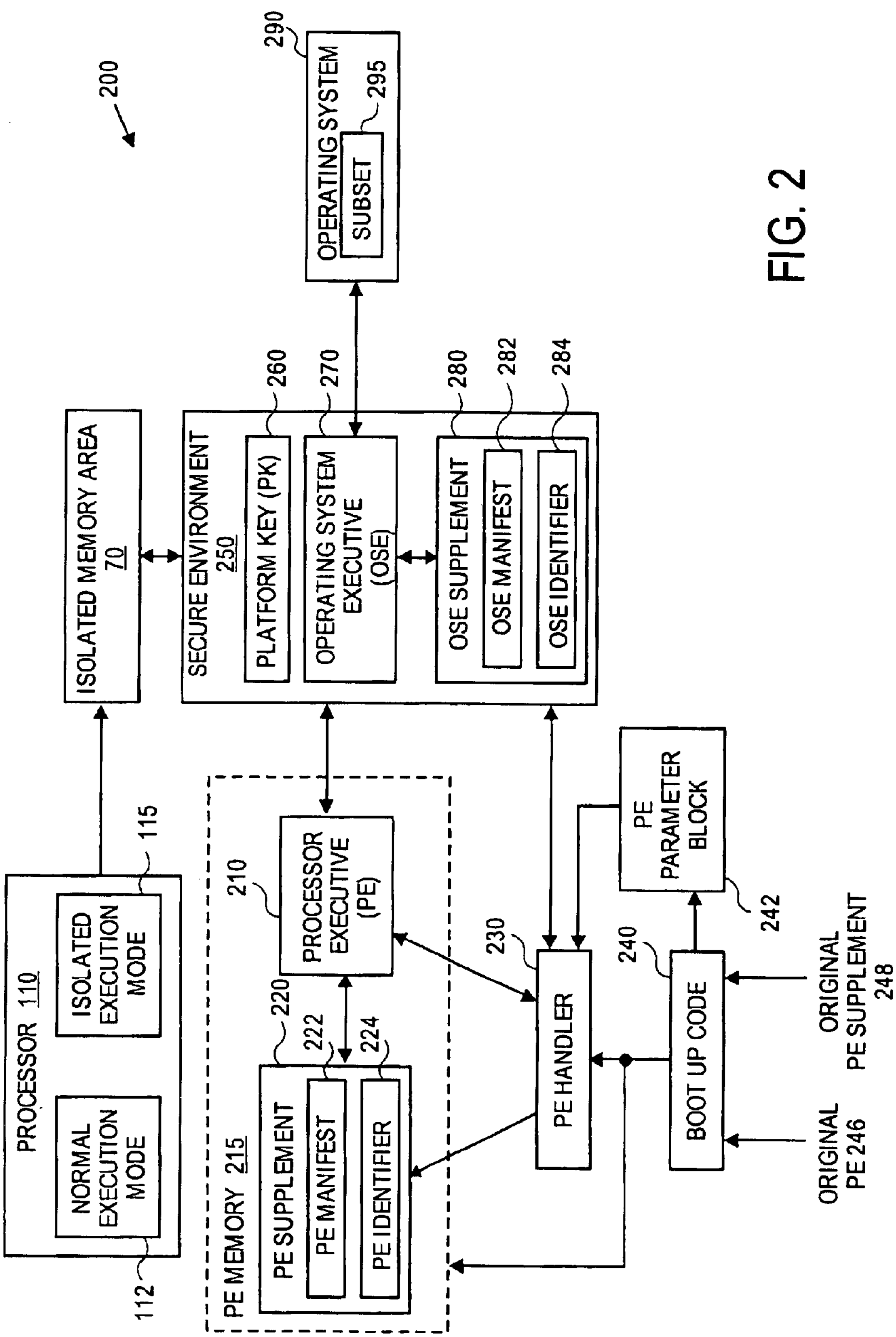
FIG. 2 is a diagram illustrating an executive subsystem according to one embodiment of the invention.

FIG. 2 is a diagram illustrating an executive subsystem 200 according to one embodiment of the invention. The executive subsystem 200 includes a processor executive (PE) 210, a PE supplement 220, a PE handler 230, a boot-up code 240, and a secure environment 250.

The processor executive (PE) 210 handles an operating system executive (OSE) 270 in the secure environment 250. The PE supplement 220 supplements the PE with a PE manifest 222 representing the PE and a PE identifier 224 to identify the PE. The PE handler 230 handles the PE 210 using a platform key (PK) 260 in the secure environment 250 and the PE supplement 220. The PE 210 and the PE supplement 220 are located in a PE memory 215. The PE memory 215 is located in the non-isolated memory area 80.

The PE handler 230 handles the PE 210 using the PK 260 and the PE supplement 220. The PE handler 230 obtains information to locate the PE memory 215 via a parameter block 242 provided by the boot-up code 240.

The boot-up code 240 boots up the platform following a power on. The boot-up code 240 obtains an original PE 246 and an original PE supplement 248 from a system ROM (e.g., system flash 160 as shown in FIG. 1C)

The secure environment 250 includes a platform key (PK) 260, an operating system executive (OSE) 270, and an OSE supplement 280. The OSE supplement 280 supplements the OSE 270 with an OSE manifest 282 representing the OSE and an OSE identifier 284 to identify the OSE. The secure environment 250 is associated with an isolated memory area 70 (FIG. 1C) in the platform. The OSE 270 manages a subset 295 of an operating system (OS) 290 running on the platform. The platform has a processor 110 operating in one of a normal execution mode 112 and an isolated execution mode 115 as shown in FIG. 1C. The isolated memory area 70 is accessible to the processor 110 in the isolated execution mode 115.

Figure 3:
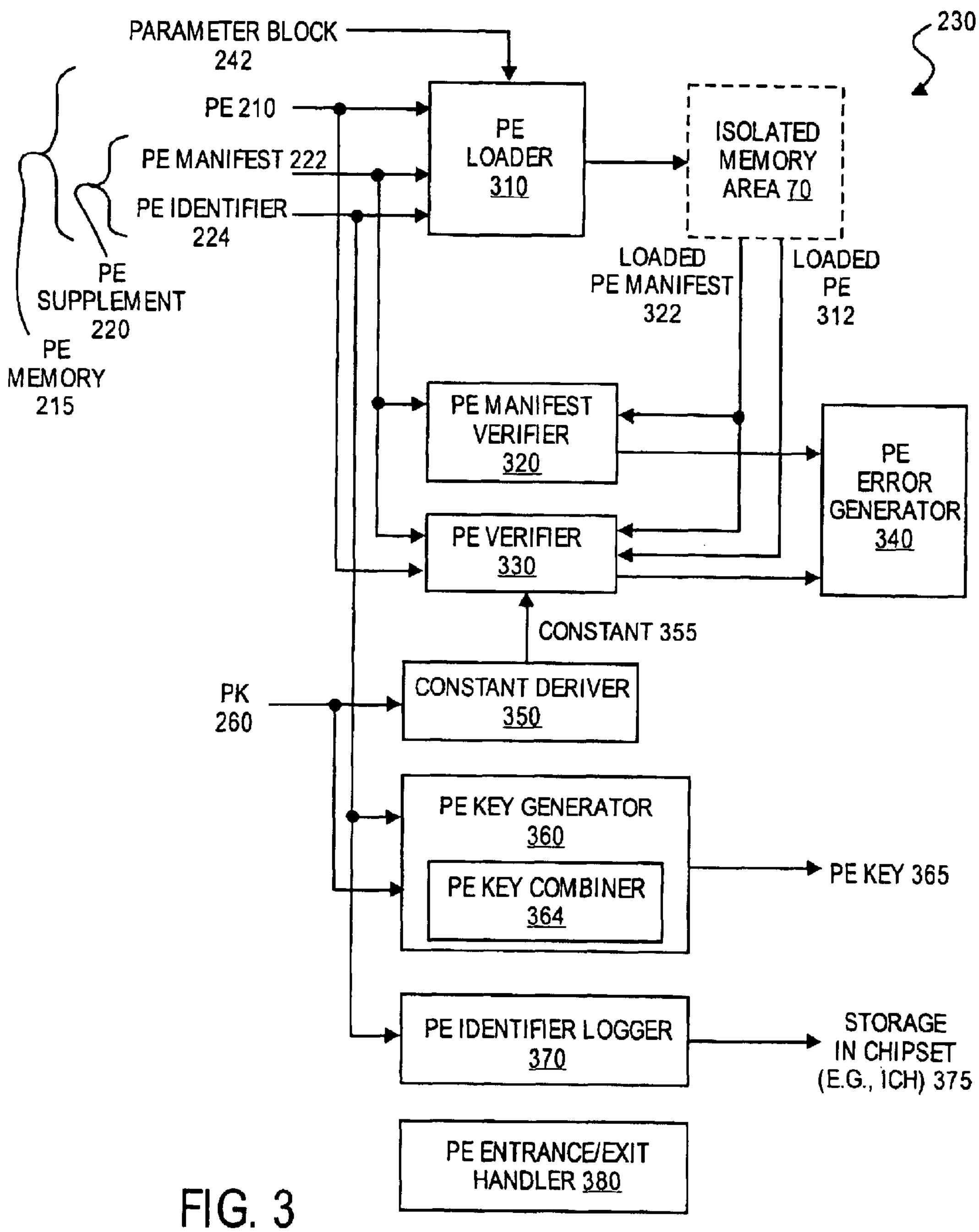
FIG. 3 is a diagram illustrating a processor executive handler shown in FIG. 2 according to one embodiment of the invention.

FIG. 3 is a diagram illustrating the PE handler 230 shown in FIG. 2 according to one embodiment of the invention. The PE handler 230 includes a PE loader 310, a PE manifest verifier 320, a PE verifier 330, a PE Error Generator 340, a Constant Driver 350, a PE key generator 360, a PE identifier logger 370, and a PE entrance/exit handler 380.

The PE loader 310 loads the PE 210 and the PE supplement 220 from the PE memory 215 (FIG. 2) into the isolated memory area 70 using a PE address in the parameter block 242 (FIG. 2) provided by the boot-up code 240. The PE loader 310 provides a loaded PE manifest 322 and a loaded PE 312 located in the isolated memory area 70 and corresponding to the PE manifest 322 and the PE 312, respectively.

The PE manifest verifier 320 verifies the PE manifest 222 by comparing the PE manifest 222 with the loaded PE manifest 322 and generates a result to a PE error generator 340. If the verification fails, the error generator 340 generates a failure or fault condition with an error code associated with the PE manifest verification.

The PE verifier 330 verifies the PE 210 using the verified loaded PE manifest 322 and a constant 355 derived from the PK 260 by a constant deriver 350. Essentially, the PE verifier 330 compares the PE 210 with the loaded PE 312. In addition, the PE verifier 330 determines a manifest of the loaded PE 312 using the constant 355 and compares the determined PE manifest with the verified loaded PE manifest 322. The PE verifier 330 then generates a result to the PE error generator 340. If the verification fails, the error generator 340 generates a failure or fault condition with an error code associated with the PE verification.

The PE key generator 360 generates a PE key 365 using the PK 260. The PE key generator 360 includes a PE key combiner 364 to combine the PE identifier 224 and the PK 260. The combined PE identifier 224 and the PK 260 correspond to the PE key 365.

The PE identifier logger 370 logs the PE identifier 224 in a storage 375. The PE identifier logger 370 writes the PE identifier 224 into the storage 375. The storage 375 is a register located inside a chipset such as the ICH 150 shown in FIG. 1C.

The PE entrance/exit handler 380 handles a PE entrance and a PE exit. The PE entrance includes obtaining the entry point in the configuration buffer of the processor 110 to represent the PE's entry handler. The PE exit returns control to the boo-up code 240.

Figure 4:
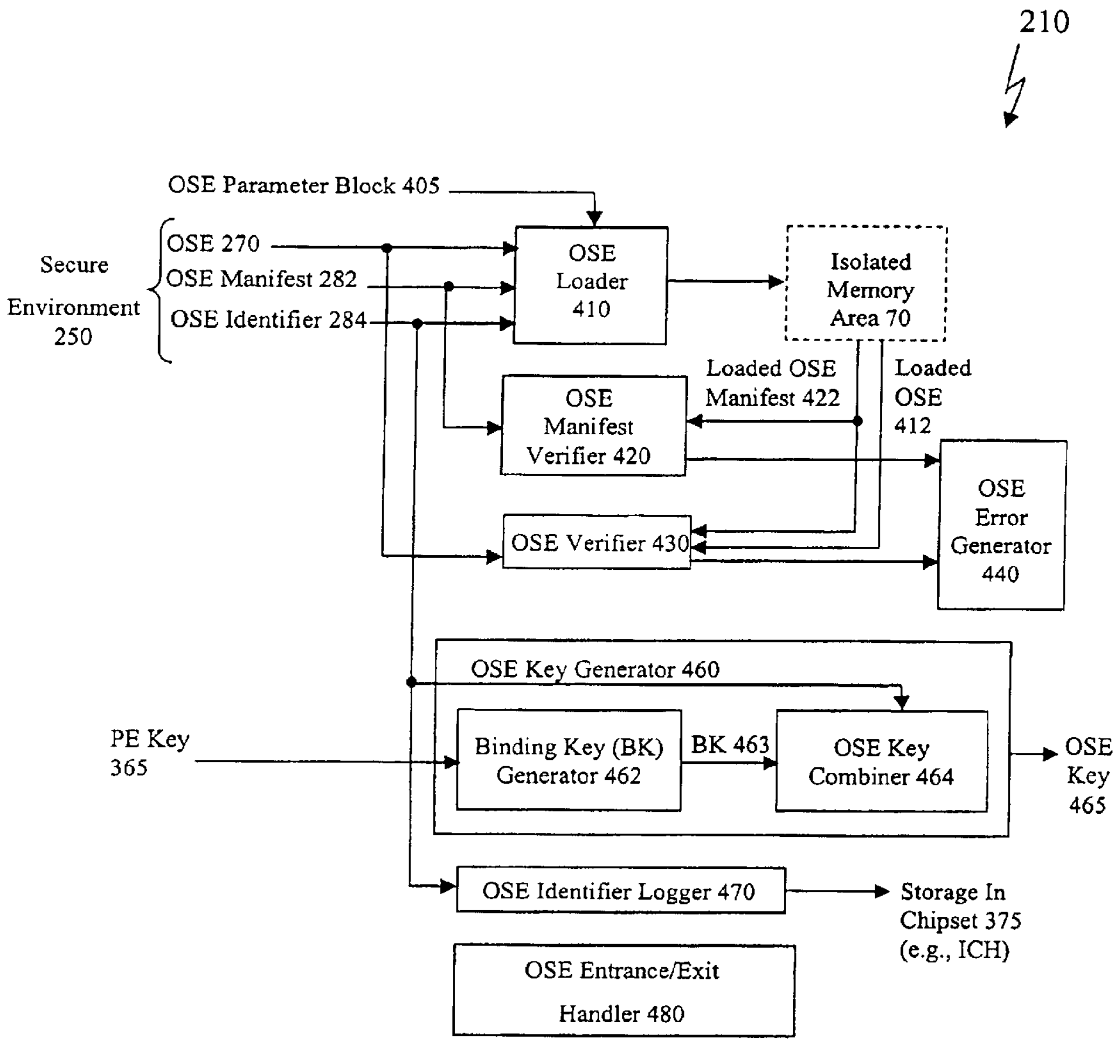
FIG. 4 is a diagram illustrating a processor executive shown in FIG. 2 according to one embodiment of the invention.

FIG. 4 is a diagram illustrating the PE 210 shown in FIG. 2 according to one embodiment of the invention. The PE 210 includes an OSE loader 410, an OSE manifest verifier 420, an OSE verifier 430, an OSE Error Generator 440, an OSE key generator 460, an OSE identifier logger 470, and an OSE entrance/exit handler 480.

The OSE loader 410loads the OSE 270 and the OSE supplement 280 into the isolated memory area 70 as shown in FIG. 2 using an OSE parameter block 405 provided by the OS 290. The OSE loader 410 provides a loaded OSE manifest 422 and a loaded OSE 412 located in the isolated memory area 70 and corresponding to the OSE manifest 282 and the OSE 270, respectively.

The OSE manifest verifier 420 verifies the OSE manifest 282 by comparing the OSE manifest 282 with the loaded OSE manifest 422. The OSE manifest verifier 420 generates a result to an OSE error generator 440. If the verification fails, the OSE error generator 440 generates a failure or fault condition with an error code associated with the OSE manifest verification.

The OSE verifier 430 verifies the OSE 270. Essentially, the OSE verifier 430 compares the OSE 270 with the loaded OSE 412. In addition, the OSE verifier 430 determines a manifest of the loaded OSE 412 using a root key and compares the determined OSE manifest with the verified loaded OSE manifest 422. The OSE verifier 430 then generates a result to the OSE error generator 440. If the verification fails, the OSE error generator 440 generates a failure or fault condition with an error code associated with the OSE verification.

The OSE key generator 460 generates an OSE key 465. The OSE key generator 460 includes a binding key (BK) generator 462 and an OSE key combiner 464. The binding key generator 462 generates a binding key (BK) 463 using the PE key 365 (FIG. 3). The OSE key combiner 464 combines the OSE identifier 284 and the BK 463. The combined OSE identifier 284 and the BK 463 correspond to the OSE key 465.

The OSE identifier logger 470 logs the OSE identifier 284 in the storage 375. The storage 375 is a register located inside a chipset such as the ICH 150 shown in FIG. 1C.

Figure 5:
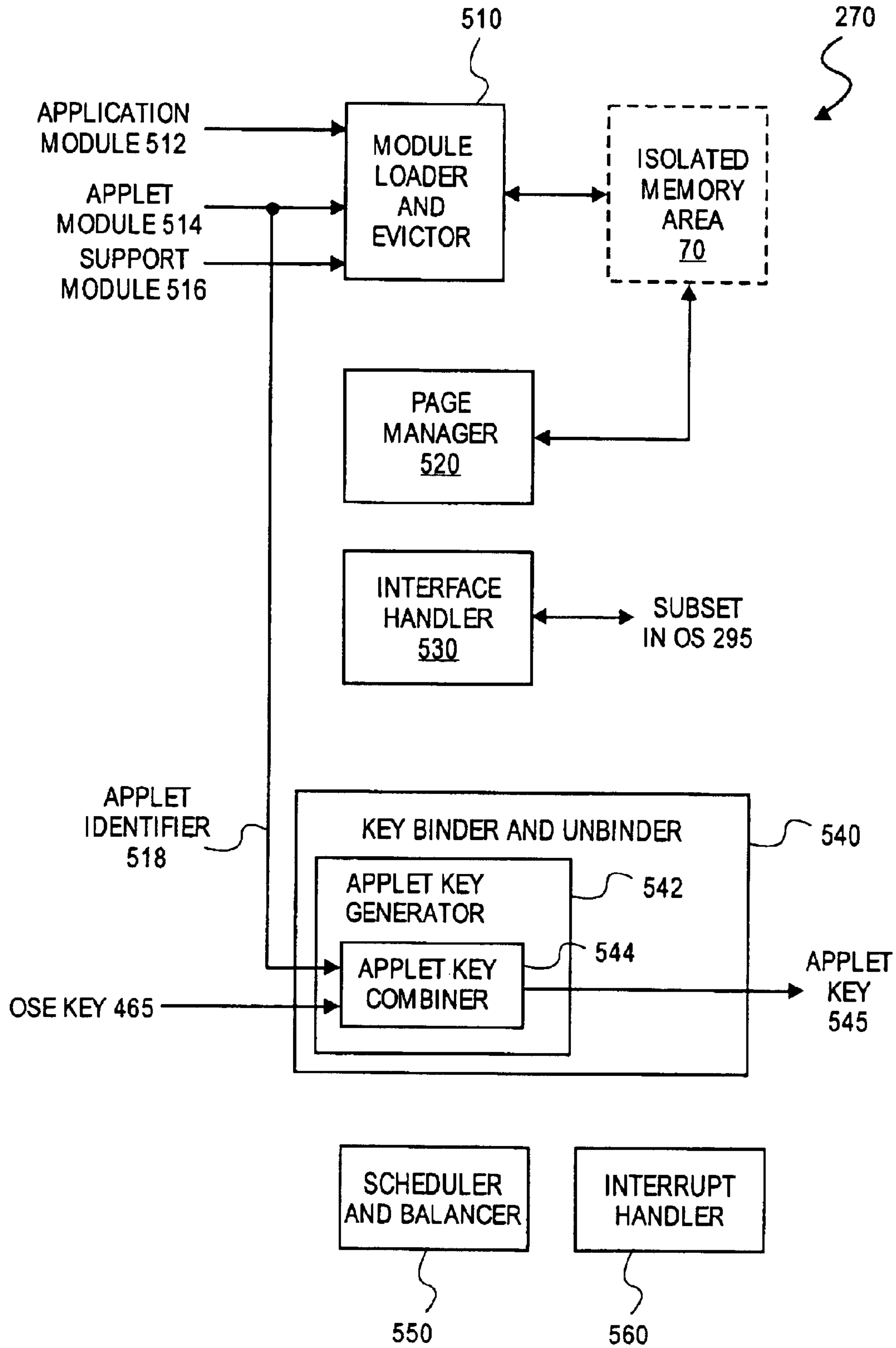
FIG. 5 is a diagram illustrating an operating system executive shown in FIG. 2 according to one embodiment of the invention.

The OSE entrance/exit handler 480 handles an OSE entrance and an OSE exit. The OSE entrance initializes parameters in a frame buffer and saves appropriate control parameters and transfers control to an entrance handler. The OSE exit clears and creates appropriate return parameters and then transfers control to the exit handler, FIG. 5 is a diagram illustrating the OSE 270 shown in FIG. 2 according to one embodiment of the invention. The OSE 270 includes a module loader and evictor 510, a page manager 520, an interface handler 530, a key binder and unbinder 540, a scheduler and balancer 550, and an interrupt handler 560.

The module loader and evictor 510 loads and evicts a module into and out of the isolated memory area 70, respectively. The module is one of an application module 512, an applet module 514, and a support module 516. The page manager 520 manages paging in the isolated memory area 70. The interface handler 530 handles interface with the subset 295 in the OS 290 (FIG. 2). The key binder and unbinder 540 includes an applet key generator 542 to generate an applet key 545 associated with the applet module 514. The applet key generator 542 includes an applet key combiner 544 combines the OSE key 465 (FIG. 4) with an applet identifier 518 identifying the applet module 514. The combined OSE key 465 and the applet identifier 518 correspond to the applet key 545.

The scheduler and balancer 550 schedules execution of the loaded modules and balances the load of the isolated execution mode. The interrupt handler 560 handles interrupts and exceptions generated in the isolated execution mode.

Figure 6:
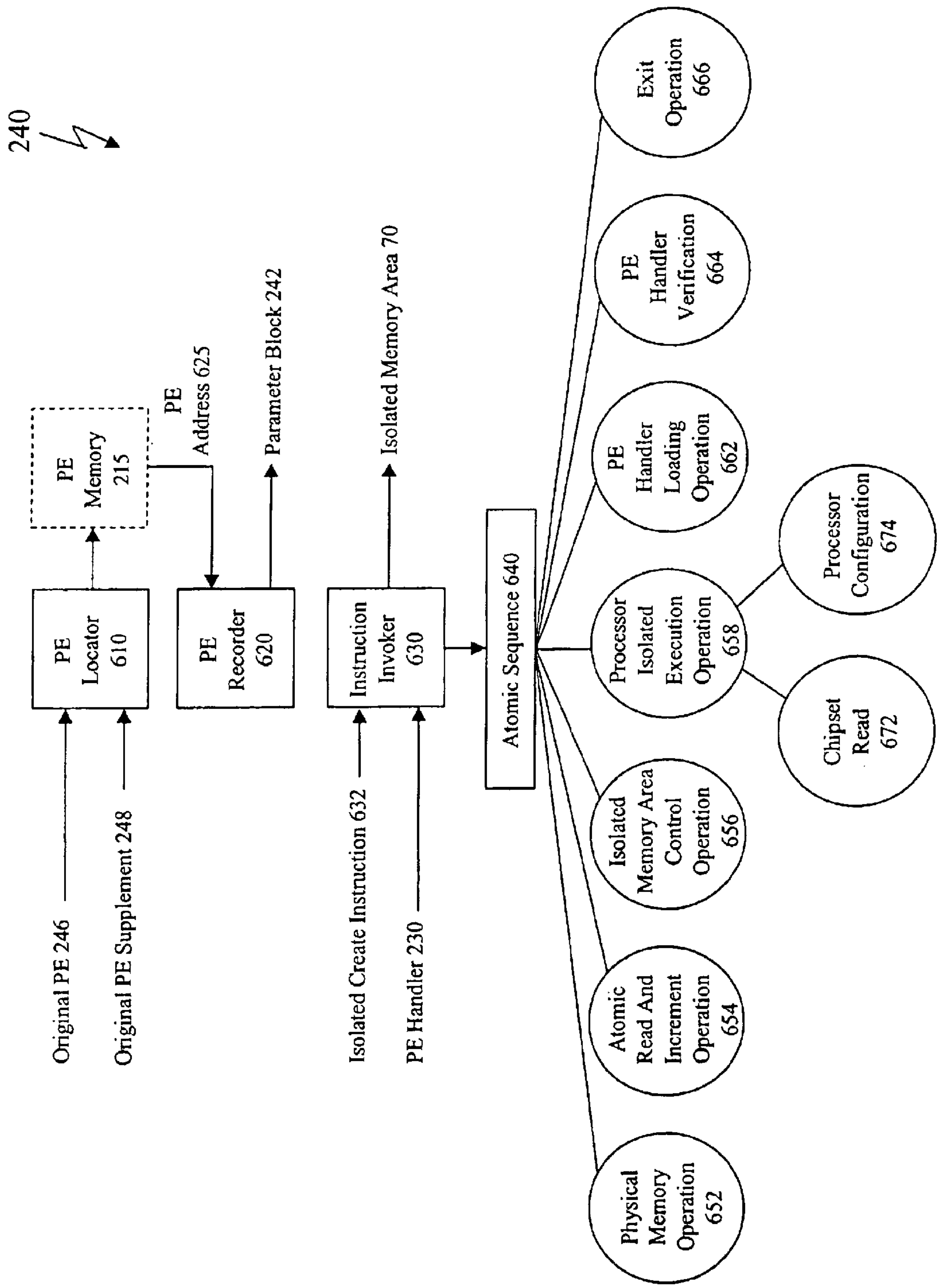
FIG. 6 is a diagram illustrating a boot-up code shown in FIG. 2 according to one embodiment of the invention.

FIG. 6 is a diagram illustrating a boot-up code shown in FIG. 2 according to one embodiment of the invention. The boot up code includes a PE locator 610, a PE recorder 620, and an instruction invoker 630.

The PE locator 610 locates the original PE 246 and the original PE supplement 248. The PE locator 610 transfers the original PE 246 and the original PE supplement 248 into the PE memory 215 at a PE address 625. The PE recorder 620 records the PE address 625 in the PE parameter block 242. As discussed above, the PE handler 230 obtains the PE address 625 from the PE parameter block 242 to locate the PE 210 and the PE supplement 220 in the PE memory 215.

The instruction invoker 630 invokes and executes an isolated create instruction 632 which loads the PE handler 230 into the isolated memory area 70. The isolated create instruction 632 performs an atomic non-interruptible sequence 640. The atomic sequence 640 includes a number of operations: a physical memory operation 652, an atomic read-and-increment operation 654, an isolated memory area control operation 656, a processor isolated execution operation 658, an PE handler loading operation 663, a PE handler verification 664, and an exit operation 666.

The physical memory operation 652 verifies if the processor is in a flat physical page mode. The atomic read-and-increment operation 654 reads and increments a thread count register in a chipset. The read-and-increment operation 654 determines if the processor is the first processor in the isolated execution mode. The isolated memory area control operation 656 configures the chipset using a configuration storage. The processor isolated execution operation 658 configures the processor in the isolated execution mode. The processor isolated execution operation 658 includes a chipset read operation 672 and a processor configuration operation 674. The chipset read operation 672 reads the configuration storage in the chipset when the processor is not a first processor in the isolated execution mode. The processor configuration operation 674 configures the processor according to the configuration storage read by the chipset read operation 672 when the processor is not a first processor in the isolated execution mode. The PE handler loading operation 662 loads the PE handler 230 into the isolated memory area 70. The PE handler verification 664 verifies the loaded PE handler. The exit operation 666 transfers control to the loaded PE handler.

Figure 7:
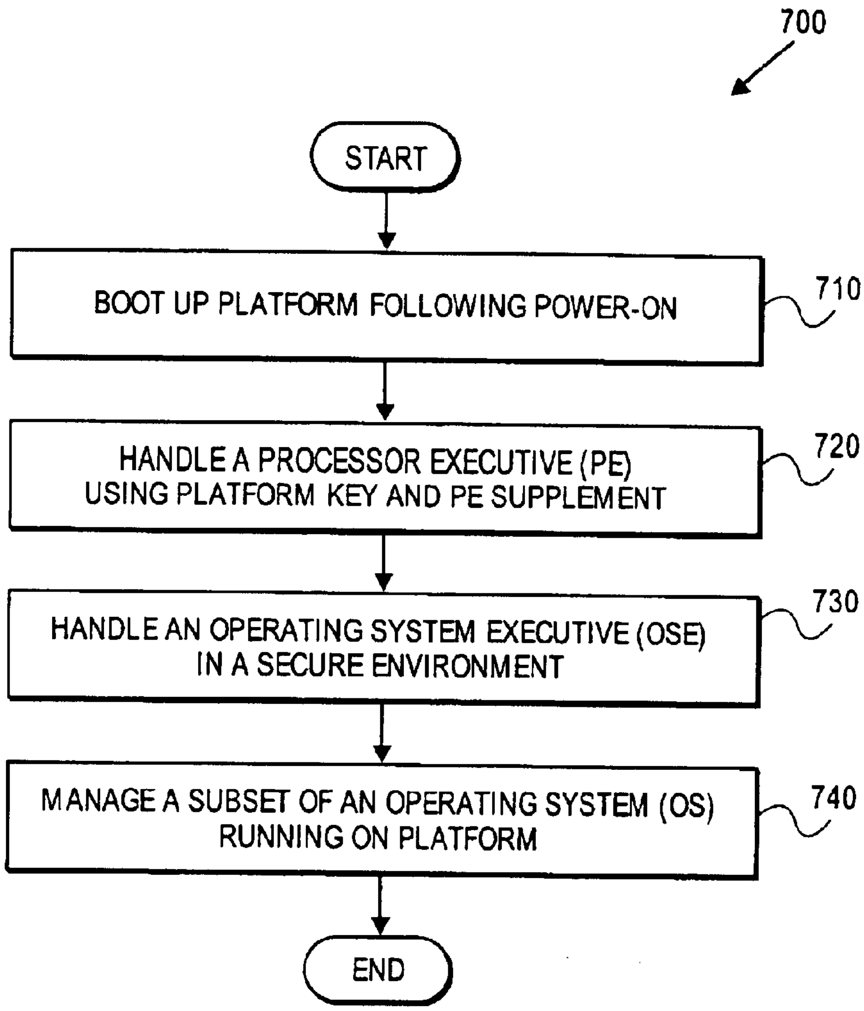
FIG. 7 is a flowchart illustrating a process to manage a secure platform according to one embodiment of the invention.

FIG. 7 is a flowchart illustrating a process 700 to manage a secure platform according to one embodiment of the invention.

Figure 8:
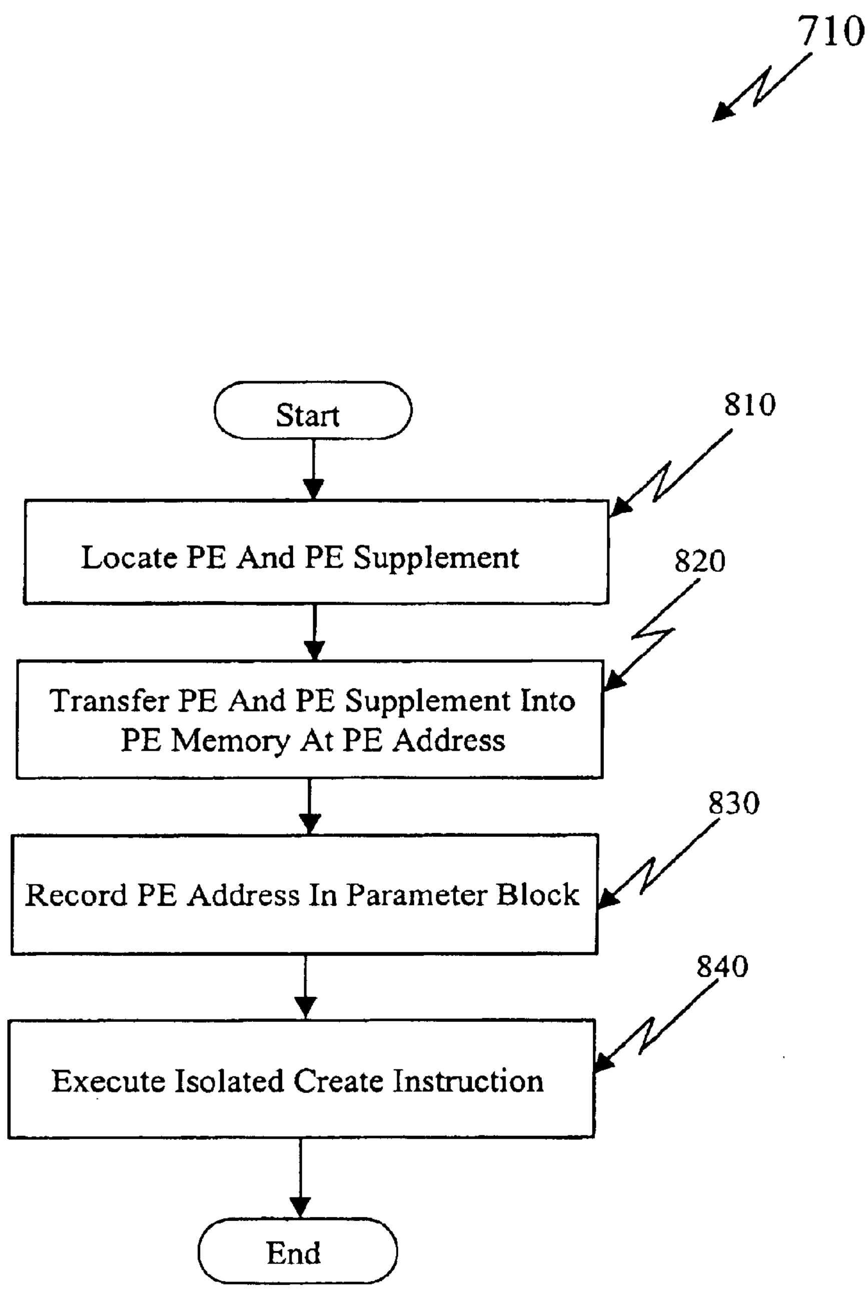
FIG. 8 is a flowchart illustrating a process to boot up platform according to one embodiment of the invention.
Figure 10:
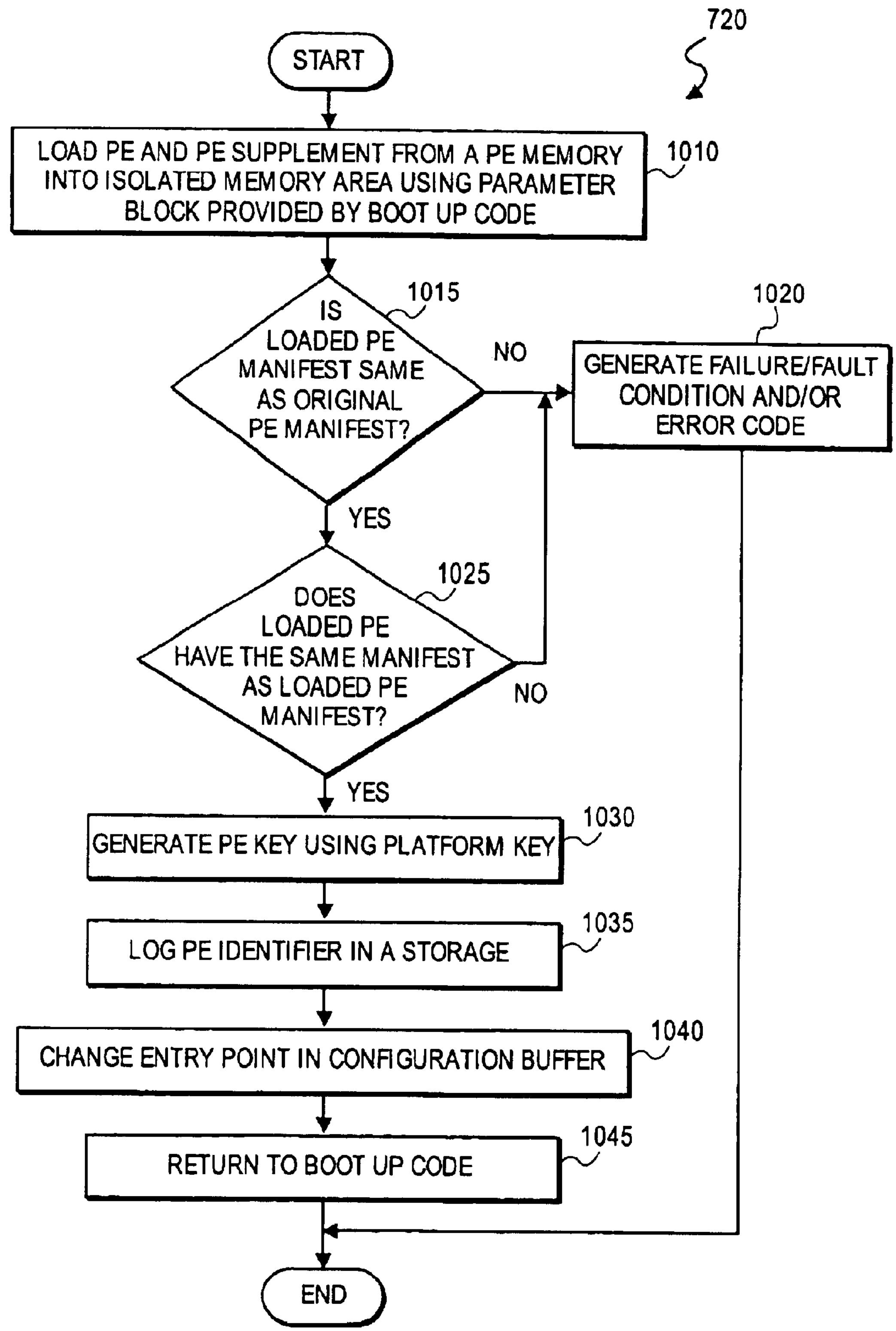
FIG. 10 is a flowchart illustrating a process to handle a processor executive according to one embodiment of the invention.
Figure 11:
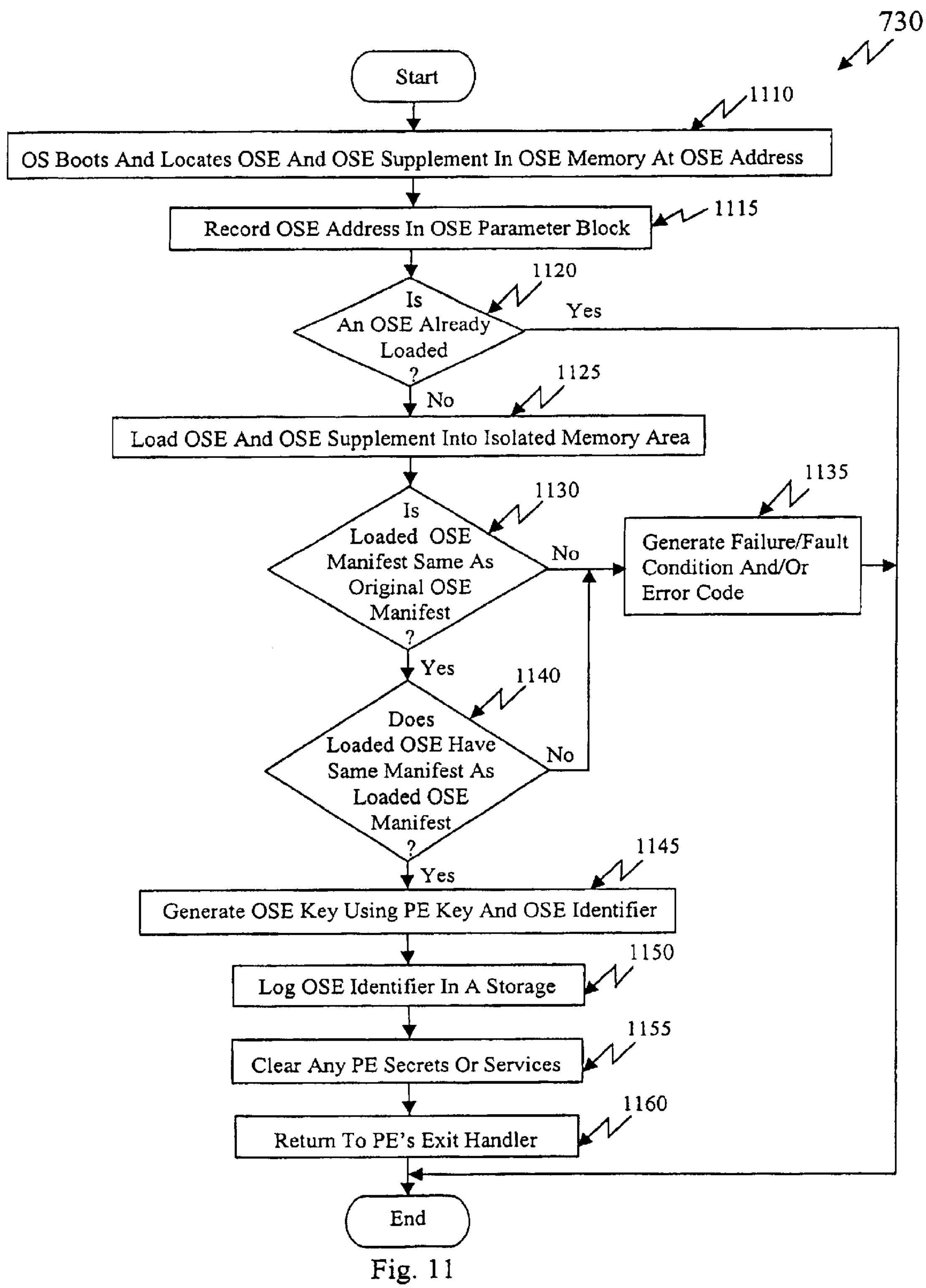
FIG. 11 is a flowchart illustrating a process to handle an operating system executive according to one embodiment of the invention.

Upon START, the process 700 boots up the platform following power on (Block 710). The platform has a secure environment. The secure environment includes a platform key, an operating system executive (OSE), and an OSE supplement. The details of the Block 710 are shown in FIG. 8. Then, the process 700 handles a processor executive (PE) using the platform key and the PE supplement (Block 720). The details of the Block 720 are shown in FIG. 10. Then, the process 700 handles the OSE in the secure environment (Block 730). The details of the Block 730 are shown in FIG. 11.

Next, the process 700 manages a subset of an operating system running on the platform (Block 740). The process 700 is then terminated.

FIG. 8 is a flowchart illustrating the process 710 to boot up platform according to one embodiment of the invention.

Figure 9:
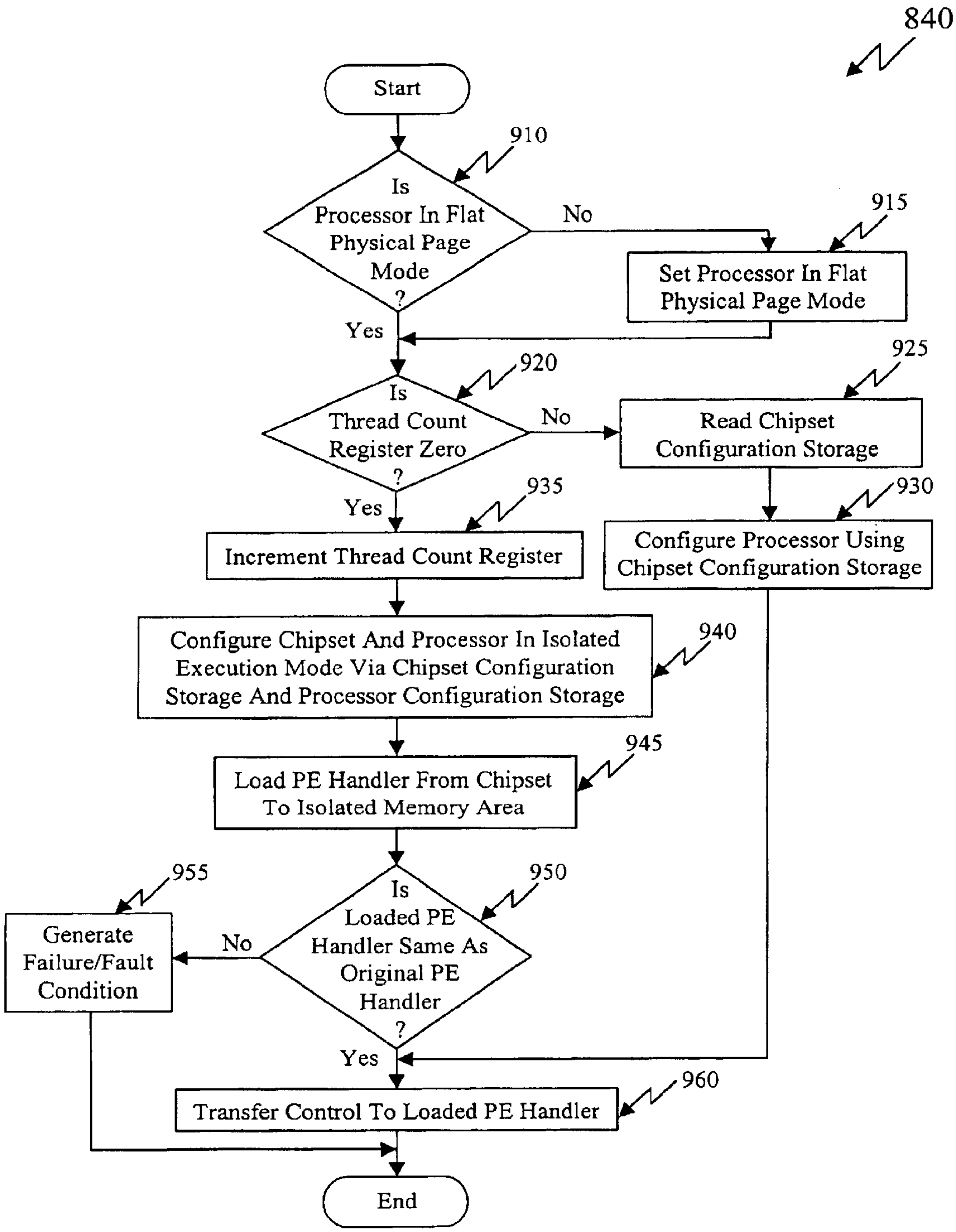
FIG. 9 is a flowchart illustrating a process to execute an isolated create instruction according to one embodiment of the invention.

Upon START, the process 710 locates the PE and the PE supplement (Block 810). Then, the process 710 transfers the PE and the PE supplement into the PE memory at a PE address (Block 820). Next, the process 710 records the PE address in a PE parameter block (Block 830). Then, the process 710 executes the isolated create instruction (Block 840). The details of the Block 840 are shown in FIG. 9. The process 710 is then terminated.

FIG. 9 is a flowchart illustrating the process 840 to execute an isolated create instruction according to one embodiment of the invention.

Upon START, the process 840 determines if the processor is in a flat physical page mode (Block 910). If not, the process 840 sets the processor in the flat physical page mode (Block 915) and proceeds to Block 920. Otherwise, the process 840 determines if the thread count register is zero (Block 920). This is done by reading the thread count register in the chipset to determine if the processor is the first processor in the isolated execution mode. If not, the process 840 determines that the processor is not the first processor in the system to be in the isolated execution mode. The process 840 then reads the configuration storage from the chipset (Block 925). Then, the process 840 configured the processor using the chipset configuration storage (Block 930). Then, the process 840 proceeds to Block 960.

If the thread count register is zero, the process 840 determines that the processor is the first processor in the system to be booted up with isolated execution mode. The process 840 then increments the thread count register to inform to other processors that there is already a processor being booted up in isolated execution mode (Block 935). Then, the process 840 configures the chipset and the processor in isolated execution mode by writing appropriate setting values (e.g., isolated mask and base values) in the chipset and processor configuration storage (Block 940). To configure the processor, the process 840 may also need to set up the isolated execution mode word in the control register of the processor.

Next, the process 840 loads the PE handler from the ROM internal to the chipset to the isolated memory area (Block 945). Then, the process 840 determines if the loaded PE handler is the same as the original PE handler in the ROM (Block 950). If not, the process 840 generates a failure or fault condition with an appropriate error code (Block 955) and is then terminated. Otherwise, the process 840 transfers control to the loaded PE handler (Block 960). The process 840 is then terminated.

FIG. 10 is a flowchart illustrating the process 720 to handle a processor executive according to one embodiment of the invention.

Upon START, the process 720 loads the PE and the PE supplement from a PE memory into the isolated memory area using a parameter block provided by the boot-up code (Block 1010). Next, the process 720 determines if the loaded PE manifest is the same as the original PE manifest (Block 1015). If not, the process 720 generates a failure or fault condition with appropriate error code (Block 1020) and is then terminated. Otherwise, the process 720 determines if the loaded PE has the same manifest as the loaded PE manifest (Block 1025). If not, the process 720 goes to Block 1020 and is then terminated. Otherwise, the process 720 generates a PE key using the platform key in the secure environment (Block 1030).

Then, the process 720 logs the PE identifier in a storage (Block 1035). This log storage is typically a register in an ICH. Then, the process 720 changes the entry point in the configuration buffer of the processor to prepare for an OSE entrance (Block 1040). Then, the process 720 returns to the boot-up code (Block 1045). The process 720 is then terminated.

FIG. 11 is a flowchart illustrating the process 730 to handle the OSE according to one embodiment of the invention.

Upon START, the OS boots and locates the OSE and the OSE supplement in the OSE memory at an OSE address (Block 1110). Then the OS records the OSE address in an OSE parameter block (Block 1115). Next, the process 730 determines if an OSE has already been loaded (Block 1120). If yes, the process 730 is terminated. Otherwise, the process 730 loads the OSE and the OSE supplement into the isolated memory area (Block 1125).

Next, the process 730 determines if the loaded OSE manifest is the same as the original OSE manifest (Block 1130). If not, the process 730 generates a failure or fault condition with an appropriate error code (Block 1135) and is then terminated. Otherwise, the process 730 determines if the loaded OSE has the same manifest as the loaded OSE manifest (Block 1140). If not, the process 730 goes to block 1135 and is then terminated. Otherwise, the process 730 generates the OSE key using the PE key and the OSE identifier (Block 1145).

Then, the process 730 logs the OSE identifier in a storage (Block 1150). Typically, this log storage is a register in a chipset such as the ICH. Next, the process 730 clears any PE secrets or services that are not needed (Block 1155). Then, the process 730 returns to the PE's exit handler (Block 1160). The process 730 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

in a platform with a processor and a memory, configuring the processor to run in an isolated execution mode within a ring 0 operating mode, wherein the processor also supports one or more higher ring operating modes, as well as a non-isolated execution mode within at least the ring 0 operating mode;

configuring the platform to establish an isolated memory area in the memory and a non-isolated memory area in the memory, wherein the platform does not allow access to the isolated memory area if the processor is not in the isolated execution mode;

executing a processor executive on the processor, with the processor running in the isolated execution mode;

loading an operating system (OS) executive into the isolated memory area, the OS executive to manage at least a subset of an OS to run on the platform;

verifying the OS executive, using the processor executive; and after verifying the OS executive, launching the OS executive, the launching of the OS executive performed by the processor executive.

2. The method of claim 1, wherein the operation of verifying the OS executive comprises:

verifying the OS executive during a process of booting the platform.

3. The method of claim 2, further comprising:

logging a processor executive identifier during the process of booting the platform; and logging an OS executive identifier during the process of booting the platform.

4. The method of claim 1, further comprising:

loading the processor executive into the isolated memory area; and verifying the processor executive, based at least in part on a processor executive manifest.

5. The method of claim 1, wherein the operation of launching the OS executive comprises:

launching the OS executive to run in the isolated execution mode.

6. The method of claim 1, further comprising:

switching from the isolated execution mode to the non-isolated execution mode;

loading an OS kernel into non-isolated memory; and executing the OS kernel in the non-isolated mode of the processor.

7. The method of claim 1, wherein:

the platform comprises a platform key (PK); and verification of the OS executive is based at least in part on the PK.

8. The method of claim 7, wherein the PK comprises a symmetric encryption/decryption key that is substantially uniquely assigned to the platform.

9. The method of claim 7, further comprising:

generating a processor executive key (PEK), based at least in part on a processor executive identifier and the PK.

10. The method of claim 9, further comprising:

generating a binding key (BK), based at least in part on the PEK.

11. The method of claim 10, further comprising:

generating an OS executive key (OSEK), based at least in part on an OS executive identifier and the BK.

12. The method of claim 1, wherein the OS executive manages at least the subset of the OS by performing operations comprising:

loading a module into the isolated memory area;

managing paging in the isolated memory area; and interfacing with an OS kernel.

13. The method of claim 1, wherein the OS executive performs operations comprising:

loading a module into the isolated memory area, the module selected from a group consisting of an application module, an applet module, and a support module.

14. The method of claim 13, wherein the OS executive performs further operations comprising:

generating an applet key associated with the applet module.

15. The method of claim 14, wherein the OS executive generates the applet key based at least in part on an OS executive key and an applet identifier identifying the applet module.

16. The method of claim 1, further comprising:

executing an isolated create instruction during a process of booting the platform, wherein execution of the isolated create instruction launches an atomic sequence of operations, the atomic sequence being non-interruptible, the atomic sequence of operations comprising:

reading a thread count register in a chipset to determine if the processor is the first processor in the isolated execution mode;

configuring the processor in the isolated execution mode;

loading a processor executive handler into the isolated memory area, verifying the loaded processor executive handler; and transferring control to the loaded processor executive handler.

17. The method of claim 16, wherein the chipset includes at least one hub selected from a group consisting of a memory controller hub (MCH) and an input/output controller hub (ICH).

18. An apparatus comprising:

a machine accessible medium; and instructions encoded in the machine accessible medium, wherein the instructions, when executed in a platform featuring a processor and a memory, cause the platform to perform operations comprising:

configuring the processor to run in an isolated execution mode within a ring 0 operating mode, wherein the processor also supports one or more higher ring operating modes, as well as a non-isolated execution mode within at least the ring 0 operating mode;

establishing an isolated memory area in the memory and a non-isolated memory area in the memory, wherein the platform does not allow access to the isolated memory area if the processor is not in the isolated execution mode;

executing a processor executive on the processor, with the processor running in the isolated execution mode;

loading an operating system (OS) executive into the isolated memory area, the OS executive to manage at least a subset of an OS to run on the platform;

verifying the OS executive, using the processor executive; and after verifying the OS executive, launching the OS executive, the launching of the OS executive performed by the processor executive.

19. The apparatus of claim 18, wherein the operation of verifying the OS executive comprises:

verifying the OS executive during a process of booting the platform.

20. The apparatus of claim 19, wherein the instructions cause the platform to perform further operations comprising:

logging a processor executive identifier during the process of booting the platform; and logging an OS executive identifier during the process of booting the platform.

21. The apparatus of claim 18, wherein the instructions cause the platform to perform further operations comprising:

loading the processor executive into the isolated memory area; and verifying the processor executive, based at least in part on a processor executive manifest.

22. The apparatus of claim 18, wherein the operation of launching the OS executive comprises:

launching the OS executive to run in the isolated execution mode.

23. The apparatus of claim 18, wherein the instructions cause the platform to perform further operations comprising:

switching the processor from the isolated execution mode to the non-isolated execution mode;

loading an OS kernel into non-isolated memory; and executing the OS kernel in the non-isolated mode of the processor.

24. The apparatus of claim 18, wherein:

the platform comprises a platform key (PK); and the platform verifies the OS executive, based at least in part on the PK.

25. The apparatus of claim 24, wherein the instructions cause the platform to perform further operations comprising:

generating a processor executive key (PEK), based at least in part on a processor executive identifier and the PK.

26. The apparatus of claim 25, wherein the instructions cause the platform to perform further operations comprising:

generating a binding key (BK), based at least in part on the PEK; and generating an OS executive key (OSEK), based at least in part on an OS executive identifier and the BK.

27. The apparatus of claim 18, wherein:

the instructions comprise the OS executive; and the OS executive manages at least the subset of the OS by performing operations comprising:

loading a module into the isolated memory area;

managing paging in the isolated memory area; and interfacing with an OS kernel.

28. The apparatus of claim 18, wherein:

the instructions comprise the OS executive; and the OS executive loads a module into the isolated memory area, the module selected from a group consisting of an application module, an applet module, and a support module.

29. The apparatus of claim 28, wherein the OS executive generates an applet key associated with the applet module, the applet key based at least in part on an OS executive key and an applet identifier identifying the applet module.

30. The apparatus of claim 18, wherein the instructions cause the platform to perform further operations comprising:

executing an isolated create instruction during a process of booting the platform, wherein execution of the isolated create instruction launches an atomic sequence of operations, the atomic sequence being non-interruptible, the atomic sequence of operations comprising:

reading a thread count register in a chipset to determine if the processor is the first processor in the isolated execution mode;

configuring the processor in the isolated execution mode;

loading a processor executive handler into the isolated memory area;

verifying the loaded processor executive handler; and transferring control to the loaded processor executive handler.

31. A system comprising:

a platform featuring memory and a processor, wherein the processor is capable of running in an isolated execution mode within a ring 0 operating mode, wherein the processor supports one or more higher ring operating modes, and wherein the processor supports a non-isolated execution mode within at least the ring 0 operating mode;

multiple machine accessible media in the platform, the multiple machine accessible media comprising at least non-volatile memory and storage within the processor; and instructions encoded in at least one of the machine accessible media, wherein the instructions, when executed in the platform, cause the platform to perform operations comprising:

configuring the processor to run in the isolated execution mode;

establishing an isolated memory area in the memory and a non-isolated memory area in the memory, wherein the platform does not allow access to the isolated memory area if the processor is not in the isolated execution mode;

executing a processor executive on the processor, with the processor running in the isolated execution mode;

loading an operating system (OS) executive into the isolated memory area, the OS executive to manage at least a subset of an OS to run on the platform;

verifying the OS executive, using the processor executive; and after verifying the OS executive, launching the OS executive, the launching of the OS executive performed by the processor executive.

32. The system of claim 31, wherein the operation of verifying the OS executive comprises:

verifying the OS executive during a process of booting the platform.

33. The system of claim 32, wherein the instructions cause the platform to perform further operations comprising:

logging a processor executive identifier during the process of booting the platform; and logging an OS executive identifier during the process of booting the platform.

34. The system of claim 31, wherein the instructions cause the platform to perform further operations comprising:

loading the processor executive into the isolated memory area; and verifying the processor executive, based at least in part on a processor executive manifest.

35. The system of claim 31, wherein the operation of launching the OS executive comprises:

launching the OS executive to run in the isolated execution mode.

36. The system of claim 31, wherein the instructions cause the platform to perform further operations comprising:

switching the processor from the isolated execution mode to the non-isolated execution mode;

loading an OS kernel into non-isolated memory; and executing the OS kernel in the non-isolated mode of the processor.

37. The system of claim 31, wherein:

the system further comprises a platform key (PK); and the platform verifies the OS executive, based at least in part on the PK.

38. The system of claim 31, wherein he platform further comprises:

a chipset communicatively coupled to the processor;

an input/output controller hub in the chipset; and a platform key (PK) stored in the input/output controller hub; and wherein the platform verifies the OS executive, based at least in part on the PK.

39. The system of claim 38, wherein the instructions cause the platform to perform further operations comprising:

generating a processor executive key (PEK), based at least in part on a processor executive identifier and the PK.

40. The system of claim 39, wherein the instructions cause the platform to perform further operations comprising:

generating a binding key (BK), based at least in part on the PEK; and generating an OS executive key (OSEK), based at least in part on an OS executive identifier and the BK.

41. The system of claim 31, wherein:

the instructions comprise the OS executive; and the OS executive manages at least the subset of the OS by performing operations comprising:

loading a module into the isolated memory area;

managing paging in the isolated memory area; and interfacing with an OS kernel.

42. The system of claim 31, wherein:

the instructions comprise the OS executive; and the OS executive loads a module into the isolated memory area, the module selected from a group consisting of an application module, an applet module, and a support module.

43. The system of claim 42, wherein the OS executive generates an applet key associated with the applet module, the applet key based at least in part on an OS executive key and an applet identifier identifying the applet module.

44. The system of claim 31, wherein the instructions cause the platform to perform further operations comprising:

executing an isolated create instruction during a process of booting the platform, wherein execution of the isolated create instruction launches an atomic sequence of operations, the atomic sequence being non-interruptible, the atomic sequence of operations comprising:

reading a thread count register in a chipset to determine if the processor is the first processor in the isolated execution mode;

configuring the processor in the isolated execution mode;

loading a processor executive handler into the isolated memory area;

verifying the loaded processor executive handler; and transferring control to the loaded processor executive handler.

* * * * *